(12) United States Patent
Li et al.

(10) Patent No.: US 10,930,207 B2
(45) Date of Patent: Feb. 23, 2021

(54) DISPLAY CONTROLLER AND CORRESPONDING DISPLAY DEVICE

(71) Applicant: BOE Technology Group Co., Ltd., Beijing (CN)

(72) Inventors: Pan Li, Beijing (CN); Yongda Ma, Beijing (CN); Xueguang Hao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 143 days.

(21) Appl. No.: 16/328,928

(22) PCT Filed: Aug. 13, 2018

(86) PCT No.: PCT/CN2018/100204
§ 371 (c)(1),
(2) Date: Feb. 27, 2019

(87) PCT Pub. No.: WO2019/062352
PCT Pub. Date: Apr. 4, 2019

(65) Prior Publication Data
US 2020/0357334 A1   Nov. 12, 2020

(30) Foreign Application Priority Data
Sep. 30, 2017   (CN) .......................... 201721290687.2

(51) Int. Cl.
*G09G 3/32* (2016.01)
*G09G 3/3208* (2016.01)
*G06F 3/041* (2006.01)

(52) U.S. Cl.
CPC ......... *G09G 3/3208* (2013.01); *G06F 3/0412* (2013.01); *G09G 2310/0267* (2013.01);
(Continued)

(58) Field of Classification Search
CPC ...... G02F 1/1333; G06F 3/041; G06F 3/0412; G09G 2310/0267; G09G 2310/0286;
(Continued)

(56) References Cited

U.S. PATENT DOCUMENTS

2006/0152460 A1*   7/2006   Toyozawa ............ G09G 3/3677
                                                    345/98
2007/0063991 A1     3/2007   Lee et al.
(Continued)

FOREIGN PATENT DOCUMENTS

CN          1642321 A      7/2005
CN          1945387 A      4/2007
(Continued)

OTHER PUBLICATIONS

International Search Report and Written Opinion of the International Searching Authority (with English language translation of Written Opinion), International Application No. PCT/CN2018/100204, dated Nov. 5, 2018, 12 pp.

*Primary Examiner* — Tony O Davis
(74) *Attorney, Agent, or Firm* — Myers Bigel, P.A.

(57) ABSTRACT

The disclosure discloses a display controller and a display device, and relates to the field of display technology. The display device includes a display panel and a display controller, and the display controller includes a display driver, data storage, mode trigger and mode controller. The output terminal of the mode trigger is connected to the input terminal of the mode controller, the output terminal of the mode controller is connected to the control terminal of a signal switcher and the control terminal of the display driver, the output terminal of the signal switcher is connected to a normal display signal terminal and a standby display signal terminal connected to the data storage, and the normal display signal terminal and the standby display signal ter-
(Continued)

minal are connected to the input terminal of the display driver. The display device provided by the disclosure may be used for standby display.

18 Claims, 12 Drawing Sheets

(52) U.S. Cl.
 CPC ............... *G09G 2310/0286* (2013.01); *G09G 2330/021* (2013.01)

(58) Field of Classification Search
 CPC .. G09G 2330/021; G09G 3/3208; G09G 3/34; G09G 3/36; H01L 27/32
 USPC ....................................... 345/96–110, 96–102
 See application file for complete search history.

(56) References Cited

U.S. PATENT DOCUMENTS

2016/0267883 A1\* 9/2016 Bibikar ................. G06F 1/3218
2019/0108796 A1 4/2019 Li et al.

FOREIGN PATENT DOCUMENTS

| CN | 207199277 U | 4/2018 |
| CN | 207199279 U | 4/2018 |
| KR | 10-2004-0065631 A | 7/2004 |

\* cited by examiner

DISPLAY CONTROLLER AND CORRESPONDING DISPLAY DEVICE

CROSS REFERENCE TO RELATED APPLICATIONS

The present application is a 35 U.S.C. 371 national stage application of PCT International Application No. PCT/CN2018/100204, filed on May 31, 2018, which claims the benefit of Chinese Patent Application No. 201721290687.2 filed on Jun. 14, 2017, the contents of which are incorporated herein by reference in their entireties.

TECHNICAL FIELD

The disclosure relates to the field of display technology, and in particular, to a display controller and a display device.

BACKGROUND

Products such as mobile phones, tablet computers, and televisions, etc. are display devices that people often see in their daily life. They can not only facilitate people's work, but also display delightful pictures and add fun to people's life.

When the above display devices are in a display state, the displayed pictures not only have content needed by people, but also are accompanied by some information that comes with the display devices, for example, information about year, month, date, etc., so as to facilitate people to decide whether to watch the pictures displayed by the display devices according to the actual situation. However, when the display devices are in a standby state, not only the needed content cannot be displayed, but also some information that comes with the display devices cannot be displayed. For example, in the standby state, if people need to know the current time information via the display devices, it is necessary to re-awaken the display devices, such that the display devices are adjusted from the standby state to a normal display state, and only in this way, can the time information be obtained. However, the power consumption required for awakening the display devices is high, and frequent awakening of the display devices will also cause a large hardware loss to the display devices.

SUMMARY

The disclosure provides the following technical solutions.

According to an aspect of the disclosure, there is provided a display controller for a display device, which display controller includes a display driver, a data storage, a mode trigger and a mode controller for controlling a display panel to be in a normal display mode or a standby display mode, the output terminal of the mode trigger being connected with the input terminal of the mode controller to trigger the mode controller for mode selection, the output terminal of the mode controller being connected with the control terminal of a signal switcher and the control terminal of the display driver, respectively, the output terminal of the signal switcher being connected with a normal display signal terminal and a standby display signal terminal connected with the data storage, respectively, and the normal display signal terminal and the standby display signal terminal being connected with the input terminal of the display driver, respectively, to provide a normal display signal and a standby display signal, respectively.

According to an embodiment of the disclosure, the display controller further includes a trigger identifier to identify a trigger signal outputted by the mode trigger, and the output terminal of the mode trigger is connected with the input terminal of the mode controller via the trigger identifier.

According to an embodiment of the disclosure, the trigger identifier includes a counting relay and a first numerical comparator, and the mode trigger includes a preset key, and the preset key is connected with the input terminal of the counting relay, such that the counting relay counts the operation of the preset key, a first input terminal of the first numerical comparator is connected with the output terminal of the counting relay, a second input terminal of the first numerical comparator is connected with a first reference signal terminal, and the output terminal of the first numerical comparator is connected with the input terminal of the mode controller, to generate a trigger signal based on the comparison of the output value of the counting relay with the first reference signal terminal, to be inputted to the mode controller.

According to an embodiment of the disclosure, the trigger identifier includes an angle identifier and a second numerical comparator, and the mode trigger includes a direction sensor and a preset key, and the direction sensor is used for identifying the direction of the display device, its output terminal is connected with the input terminal of the angle identifier, the angle identifier is used for identifying the angle of the display device based on the direction of the display device identified by the direction sensor, a first input terminal of the second numerical comparator is connected with the output terminal of the angle identifier, a second input terminal of the second numerical comparator is connected with a second reference signal terminal, and the output terminal of the second numerical comparator and the preset key are connected with input terminals of the mode controller, respectively, to generate a trigger signal based on the comparison of the output value of the angle identifier with the input value of the second reference signal terminal, to be inputted to the mode controller.

According to an embodiment of the disclosure, the direction sensor is a three-dimensional gyroscope or an angular velocity sensor, and the angle identifier is an angular velocity integration circuit for converting an angular velocity into a rotation angle.

According to an embodiment of the disclosure, the display panel is a touch-typed display panel, the mode trigger includes a touch detector and a preset key, the trigger identifier includes a first logic AND gate operation circuit and a light sensor for detecting the light of the display surface of the touch-typed display panel, the output terminal of the light sensor is connected with a first input terminal of the first logic AND gate operation circuit, the output terminal of the touch detector is connected with a second input terminal of the first logic AND gate operation circuit, and the output terminal of the first logic AND gate operation circuit and the preset key are connected with input terminals of the mode controller, respectively, to cause the mode controller to drive the touch-typed display panel for standby display when the touch detector detects touch information and the light sensor detects that the display screen of the touch-typed display panel has light.

According to an embodiment of the disclosure, the touch detector is a gesture identifier or a fingerprint identifier, the trigger identifier further includes a second logic AND gate operation circuit, a first input terminal of the second logic AND gate operation circuit is connected with the output terminal of the touch detector, and a second input terminal of the second logic AND gate operation circuit is connected with a third reference signal terminal, and the output terminal of the second logic AND gate operation circuit is connected with the second input terminal of the first logic AND gate operation circuit, such that the second logic AND gate operation circuit outputs an electrical signal to the first logic AND gate operation circuit when the output signal of the touch detector is consistent with the output signal of the third reference signal terminal.

According to an embodiment of the disclosure, the trigger identifier further includes a touch locator, the output terminal of the touch detector is further connected with the input terminal of the touch locator, and the output terminal of the touch locator is connected with the input terminal of the mode controller, such that in the standby display, after receiving location information sent by the touch locator, the mode controller controls the display driver to drive the touch-typed display panel for standby display according to the location information.

According to an embodiment of the disclosure, the touch-typed display panel is a touch-typed liquid crystal display panel, which includes a standby display area located in a normal display area, the display panel includes a backlight module, which includes m normal display light sources for corresponding to the normal display area, the display controller further includes a backlight apparatus, which includes a backlight controller, a power supply and m electromagnetic switches for power supply which are connected with the power supply, and the m electromagnetic switches for power supply are in one-to-one correspondence connection with the m normal display light sources, and the output terminal of the mode controller is further connected with the input terminal of the backlight controller, and the output terminal of the backlight controller is connected with the control terminals of the m electromagnetic switches for power supply, respectively, to control the light-on and light-off of the m normal display light sources according to the output of the mode controller.

According to an embodiment of the disclosure, the display panel is a liquid crystal display panel, which includes a standby display area located in a normal display area, the display panel includes a backlight module, which includes m normal display light sources for corresponding to the normal display area, wherein k normal display light sources correspond to the standby display area as k standby display light sources, the display controller further includes a backlight controller, which includes a standby backlight controller, a power supply and m electromagnetic switches for power supply which are connected with the power supply, the m normal display light sources are in one-to-one correspondence connection with the m electromagnetic switches for power supply, and the output terminal of the mode controller is further connected with the control terminals of the m electromagnetic switches for power supply and the input terminal of the standby backlight controller, respectively, and the output terminal of the standby backlight controller is connected with control terminals of electromagnetic switches for power supply corresponding to the k normal display light sources as the k standby display light sources, respectively, to control the light-on and light-off of the normal display light sources according to the output of the mode controller, wherein 1<k<m.

According to an embodiment of the disclosure, the display panel is a liquid crystal display panel, which includes a standby display area located in a normal display area, the display panel includes a backlight module, which includes a light guide diaphragm, m normal display light sources for corresponding to the normal display area, and k standby display light sources for corresponding to the standby display area, the m normal display light sources are located on a first side of the light guide diaphragm as a light incident surface, and the k standby display light sources are located on a second side of the light guide diaphragm, the display controller further includes a backlight controller, which includes a standby backlight controller and a normal backlight controller, the output terminal of the mode controller is connected with the control terminal of the standby backlight controller and the input terminal of the normal backlight controller, respectively, and the output terminal of the normal backlight controller is connected with the m normal display light sources, respectively, and the output terminal of the standby backlight controller is connected with the k standby display light sources, respectively, to control the light-on and light-off of the normal display light sources and the standby display light sources according to the output of the mode controller.

According to an embodiment of the disclosure, the signal switcher includes an electromagnetic switch for standby display and an electromagnetic switch for normal display, the electromagnetic switch for standby display is arranged on the standby display signal terminal, the electromagnetic switch for normal display is arranged on the normal display signal terminal, and the output terminal of the mode controller is connected with the control terminal of the electromagnetic switch for standby display and the control terminal of the electromagnetic switch for normal display, respectively, to control the opening and closing of the electromagnetic switch for standby display and electromagnetic switch for normal display according to a trigger signal received by the mode controller.

According to an embodiment of the disclosure, the display driver includes a timing controller, a data driver and a gate driver, the display panel includes at least an array substrate, which includes an arrayed thin film transistor, the output terminal of the mode controller is connected with the control terminal of the timing controller, the normal display signal terminal and the standby display signal terminal are connected with the input terminal of the timing controller, respectively, the output terminal of the timing controller is connected with the input terminal of the data driver and the input terminal of the gate driver, respectively, the output terminal of the data driver is connected with the signal input terminal of the arrayed thin film transistor, and the output terminal of the gate driver is connected with the control terminal of the arrayed thin film transistor, such that the display panel is caused to display standby display data or normal display data by the timing controller under the control of the mode controller.

According to another aspect of the disclosure, there is provided a display device including a display panel and a display controller as described in any of the above embodiments.

According to an embodiment of the disclosure, the display panel is an OLED display panel.

BRIEF DESCRIPTION OF THE DRAWINGS

The accompanied drawings described here are used to provide further understanding of the disclosure, and constitute part of the disclosure. Schematic embodiments of the disclosure and the description thereof are used for explaining the disclosure, and do not constitute unduly limitation of the disclosure. In the drawings.

DETAILED DESCRIPTION

In the following the technical solutions in embodiments of the disclosure will be described clearly and completely in conjunction with the drawings in the embodiments of the disclosure. Obviously, the described embodiments are just a part of the embodiments of the disclosure, and not all the embodiments. Based on the embodiments in the disclosure, all the other embodiments obtained by the person having ordinary skills in the art under the premise of not paying out undue experimentation pertain to the scope protected by the disclosure.

Figure 1:
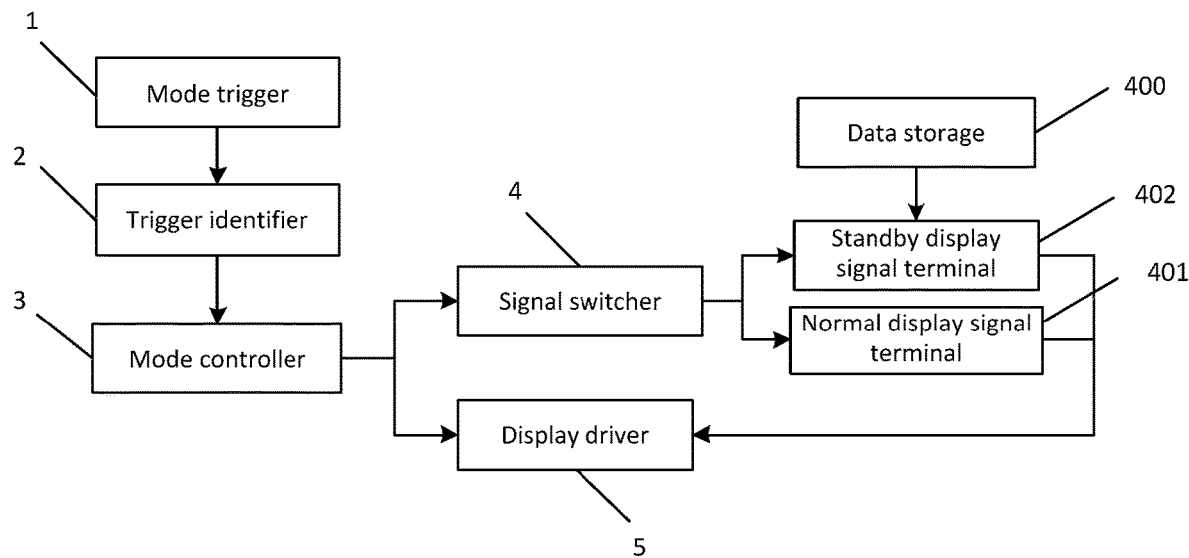
FIG. 1 is a structural block diagram of a display controller in an embodiment of the disclosure.

With reference to FIG. 1, a display device provided by an embodiment of the disclosure includes a display panel and a display controller, the display controller includes a display driver 5, a data storage 400, a mode trigger 1 and a mode controller 3 for controlling the display panel to be in a normal display mode or a standby display mode, the output terminal of the mode trigger 1 is connected with the input terminal of the mode controller 3, the output terminal of the mode controller 3 is connected with the control terminal of a signal switcher 4 and the control terminal of the display driver 5, respectively, the output terminal of the signal switcher 4 is connected with a normal display signal terminal 401 and a standby display signal terminal 402 connected with the data storage 400, respectively, and the normal display signal terminal 401 and the standby display signal terminal 402 are connected with the input terminal of the display driver 5, respectively.

In a specific implementation, when it is needed to display information that comes with the display device in a standby condition, the mode trigger 1 sends out a first trigger electrical signal to the mode controller 3, such that the mode controller 3 controls the operation of the display driver 5 according to the first trigger electrical signal, and the signal switcher 4 causes the standby display signal terminal 402 to provide a standby display signal to the display driver 5 according to the first trigger electrical signal, which standby display signal is information stored by the data storage 400 which comes with the display device.

When normal display is needed, a second trigger electrical signal is sent out to the mode controller 3 via the mode trigger 1, such that the mode controller 3 controls the operation of the display driver 5 according to the second trigger electrical signal, and the signal switcher 4 causes the normal display signal terminal to provide a normal display signal according to the second trigger electrical signal.

It may be found out based on the structure of the display device that the output terminal of the mode trigger 1 is connected with the input terminal of the mode controller 3, such that the mode trigger 1 can trigger the mode controller 3 for mode selection, the output terminal of the mode controller 3 is connected with the control terminal of the signal switcher 4 and the control terminal of the display driver 5, respectively, the output terminal of the signal switcher 4 is connected with the normal display signal terminal 401 and the standby display signal terminal 402 connected with the data storage 400, respectively, and the normal display signal terminal 401 and the standby display signal terminal 402 are connected with the input terminal of the display driver 5, respectively, such that when normal display is needed, a first trigger electrical signal is sent to the mode controller 3 via the mode trigger 1, such that the mode controller 3 controls the display driver 5 according to the first trigger electrical signal, when standby display is needed, the signal switcher 4 is controlled by the mode controller 3, such that the standby display signal terminal 402 provides a standby display signal with the display driver 5, and as such, it is possible to trigger the standby display mode via the mode trigger in a standby state, to display information content (e.g., year, month, date) that comes with the display device which is provided via the standby display signal terminal 402 by the data storage, whereas display of the information content that comes with the display device needs to cause the display driver 5 to drive all the pixels of the display panel to work, so for the display device provided by the disclosure in the standby state, it is only necessary to trigger the standby display mode via the mode trigger 1, which reduces the power consumption of the display device when the display device displays its own information and the hardware loss of the display device.

It may be appreciated that the data storage 400 in the above embodiment may be a memory of the display device, or also may be an additionally connected data storage 400 which is connected with a timer to store time information calculated by the timer in real time. Of course, the data storage 400 is not only limited to storing information that comes with the display device, and also may store a normal display signal when in normal display.

In an embodiment, the display controller in the above-described embodiment further includes a trigger identifier 2, and the output terminal of the mode trigger 1 is connected with the input terminal of the mode controller 3 via the trigger identifier 2, such that when the mode trigger 1 sends out a first trigger signal, it is possible to perform confirmation of the trigger signal via the trigger identifier 2, guaranteeing the accuracy and authenticity of the inputted first trigger signal.

In the following, a specific implementation structure and an identification principle of the trigger identifier 2 will be exemplified in connection with FIG. 2 and FIG. 3.

Figure 2:
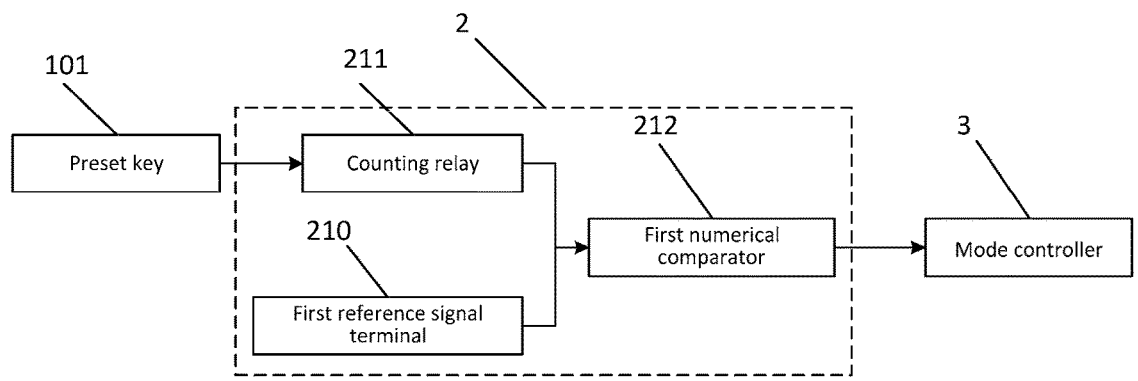
FIG. 2 is a structural block diagram of a first implementation of a trigger identifier in an embodiment of the disclosure.

A first implementation structure is as shown in FIG. 2. The trigger identifier 2 includes a counting relay 211 and a first numerical comparator 212, and the mode trigger 1 is a preset key 101, and the preset key 101 is connected with the input terminal of the counting relay 211, a first input terminal of the first numerical comparator 212 is connected with the output terminal of the counting relay 211, a second input terminal of the first numerical comparator 212 is connected with a first reference signal terminal 210, and the output terminal of the first numerical comparator 212 is connected with the input terminal of the mode controller 3. The preset key 101 may be any switch key on the display device, or also may be an additionally connected key, or also may be a "home" key in the display device.

At this point, since the preset key 101 is connected with the input terminal of the counting relay 211, and in turn, the first input terminal of the first numerical comparator 212 is connected with the output terminal of the counting relay 211, the second input terminal of the first numerical comparator 212 is connected with the first reference signal terminal 210, and the output terminal of the first numerical comparator 212 is connected with the input terminal of the mode controller 3, the counting relay 211 may identify the pressing number of times of the preset key 101, and the first numerical comparator 212 may compare the pressing number of times of the preset key 101 identified by the counting relay 211 with a reference signal provided by the first reference signal terminal 210, to send out a first trigger electrical signal to the mode controller 3 when the pressing number of times of the preset key 101 is equal to the reference signal, such that the mode controller 3 controls the display panel to be in the standby display mode, and to send out a second trigger electrical signal to the mode controller 3 when the pressing number of times of the preset key 101 is greater than the reference signal, such that the mode controller controls the display panel to be in the normal display mode.

Figure 3:
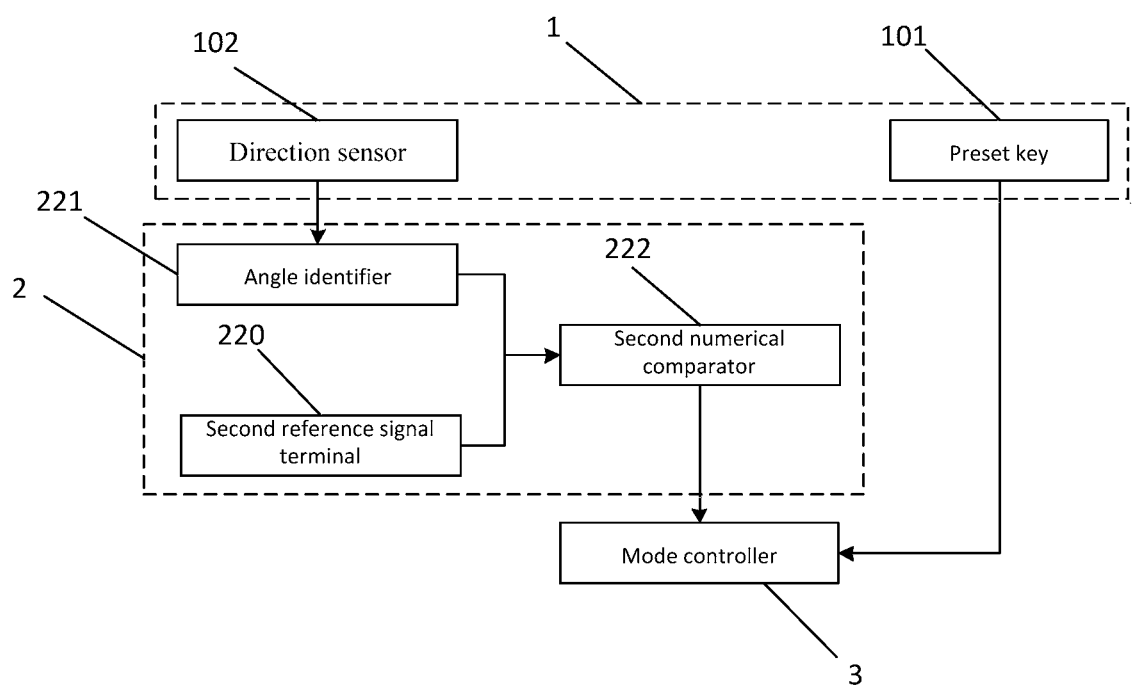
FIG. 3 is a structural block diagram of a second implementation of a trigger identifier in an embodiment of the disclosure.

A second implementation structure is as shown in FIG. 3. The trigger identifier 2 in the above-described embodiment includes an angle identifier 221 and a second numerical comparator, and the mode trigger 1 includes a direction sensor 102 and a preset key 101, the output terminal of the direction sensor 102 is connected with the input terminal of the angle identifier 221, a first input terminal of the second numerical comparator is connected with the output terminal of the angle identifier 221, a second input terminal of the second numerical comparator is connected with a second reference signal terminal, and the output terminal of the second numerical comparator and the preset key 101 are connected with input terminals of the mode controller 3, respectively, and the preset key 101 may be any switch key on the display device, or also may be an additionally connected key, or also may be a "home" key in the display device.

At this point, since the output terminal of the direction sensor 102 is connected with the input terminal of the angle identifier 221, the first input terminal of the second numerical comparator is connected with the output terminal of the angle identifier 221, the second input terminal of the second numerical comparator is connected with the second reference signal terminal 220, and the output terminal of the second numerical comparator is connected with an input terminal of the mode controller 3, the direction sensor 102 may identify the direction of the display device, and the angle which the display device is at is identified by the angle identifier 221, and then the second numerical comparator is utilized to compare the angle which the display device is at and a reference signal provided by the second reference signal terminal 220, to provide a first trigger electrical signal to the mode controller 3 in a condition in which they are equal, such that the mode controller 3 controls the display panel to be in the standby display mode, and not to send out a trigger electrical signal in a condition in which the pressing number of times of the preset key 101 is greater than the reference signal, and the standby state is kept. As for a specific process of the mode controller 3 controlling the display panel to be in the standby display mode, please refer to the forgoing description.

On the other hand, since the preset key 101 is connected with an input terminal of the mode controller 3, when normal display is needed, a second trigger electrical signal is sent out to the mode controller 3 by pressing the preset key 101, such that after the mode controller 3 receives the second trigger electrical signal, the mode controller 3 controls the display panel to be in the normal display mode. As for a process of the mode controller 3 controlling the display panel to be in the normal display mode, please refer to the forgoing description.

In an example, the direction sensor 102 is a three-dimensional gyroscope or an angular velocity sensor, and the angle identifier 221 is an angular velocity integration circuit for converting an angular velocity into a rotation angle, in order to utilize the angular velocity integration circuit to convert an angular velocity sensed by the three-dimensional gyroscope or the angular velocity sensor into a rotation angle.

Figure 4:
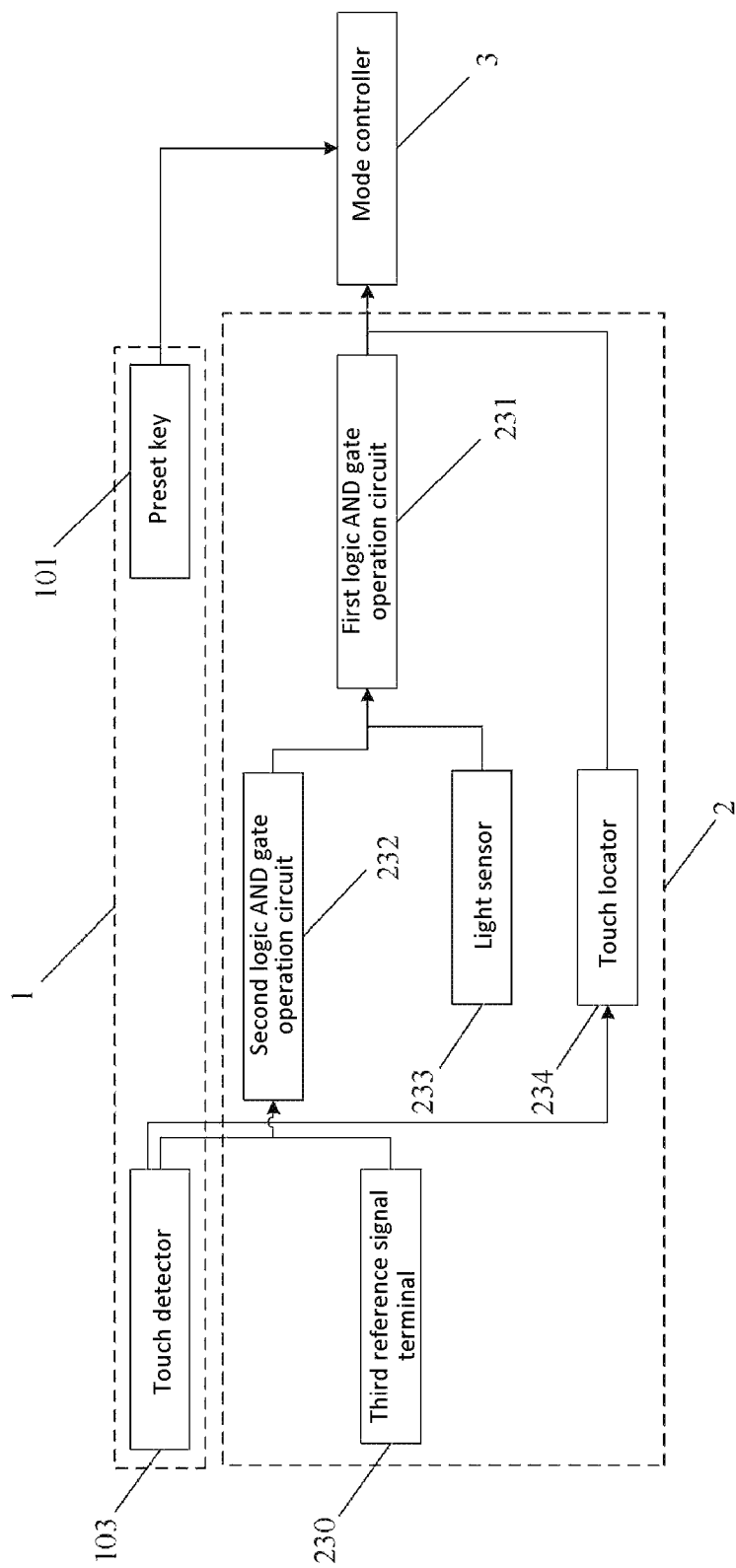
FIG. 4 is a structural block diagram of a third implementation of a trigger identifier in an embodiment of the disclosure.

A third implementation structure is as shown in FIG. 4. The display panel is a touch-typed display panel, the mode trigger 1 is a touch detector 103 and a preset key 101, the trigger identifier 2 includes a first logic AND gate operation circuit 231 and a light sensor 233 for detecting the light of the display surface of the touch-typed display panel, the output terminal of the light sensor 233 is connected with a first input terminal of the first logic AND gate operation circuit 231, the output terminal of the touch detector 103 is connected with a second input terminal of the first logic AND gate operation circuit 231, and the output terminal of the first logic AND gate operation circuit 231 and the preset key 101 are connected with input terminals of the mode controller 3, respectively, and the preset key 101 may be any switch key on the display device, or also may be an additionally connected key, or also may be a "home" key in the display device.

At this point, since the output terminal of the touch detector 103 is connected with an input terminal of the mode controller 3, in an electrode condition, it is only necessary to touch the touch-typed display panel, such that the touch detector 103 detects a touch signal and sends it to the mode controller 3 in the form of a first trigger electrical signal, such that the mode controller 3 controls the touch-typed display panel to be in the standby display mode. As for a process of the mode controller 3 controlling the touch-typed display panel to be in the standby display mode, please refer to the forgoing description. On the other hand, since the preset key 101 is connected with an input terminal of the mode controller 3, when normal display is needed, the preset key 101 is caused to send a second trigger electrical signal by pressing the preset key 101, and when the mode controller 3 receives the second trigger electrical signal, the mode controller 3 controls the touch-typed display panel to be in the normal display mode. As for a process of the mode controller 3 controlling the touch-typed display panel to be in the normal display mode, please refer to the forgoing description.

In addition, considering that the touch-typed display panel is touched by mistake under a certain circumstance, for example, the touch-typed display panel keeps the state of being touched all the time when a hand(s) holds/hold the touch-typed display panel, and at this moment, there is no light inside the touch-typed display panel, an embodiment of the disclosure further introduces a light sensor 233 for detecting the light of the display surface of the touch-typed display panel, and since the output terminal of the touch detector 103 is connected with an input terminal of a second logic AND gate operation circuit 232, and the output terminal of the first logic AND gate operation circuit 231 is connected with an input terminal of the mode controller 3, the light sensor 233 may detect whether the display screen of the touch-typed display panel has light, and if the first logic AND gate operation circuit 231 outputs an electrical signal, it indicates that the light sensor 233 has detected light and the touch detector 103 has identified touch information, and at this point, the electrical signal outputted by the first logic AND gate operation circuit 231 may be utilized to control the mode controller 3, to cause the display panel to be in the standby display mode.

If the first logic AND gate operation circuit 231 has no electrical signal to be outputted, and the touch detector 103 detects information, it indicates that the light sensor 233 has not detected light, and at this moment, the first logic AND gate operation circuit 231 cannot control the mode controller 3 to cause the display panel to be in the standby display mode.

Exemplarily, as shown in FIG. 4, the touch detector 103 in the above-described embodiment is a gesture identifier or a fingerprint identifier, the trigger identifier 2 further includes a second logic AND gate operation circuit 232, a first input terminal of the second logic AND gate operation circuit 232 is connected with the output terminal of the touch detector 103, and a second input terminal of the second logic AND gate operation circuit 232 is connected with a third reference signal terminal 230, and the output terminal of the second logic AND gate operation circuit 232 is connected with the second input terminal of the first logic AND gate operation circuit 231.

When the touch detector 103 is a gesture identifier, it can further be judged by the second logic AND gate operation circuit 232 whether the touch gesture is identical to a preset gesture signal provided by the third reference signal terminal 230, so as to input a first trigger electrical signal to the first logic AND gate operation circuit 231 when they are identical, and on the other hand, when the touch detector 103 is a fingerprint identifier, it can be judged by the second logic AND gate operation circuit 232 whether the touch fingerprint is identical to a preset fingerprint signal provided by the third reference signal terminal 230, so as to input a first trigger electrical signal to the first logic AND gate operation circuit 231 when they are identical.

Here, it needs to be noted that the above third reference signal terminal 230 may be selected to be connected with a different storage depending on the touch detector 103. If the touch detector 103 is a gesture identifier, the third reference signal terminal 230 is connected with a preset fingerprint storage, to provide a preset fingerprint signal to the second logic AND gate operation circuit 232, and if the touch detector 103 is a gesture identifier, the third reference signal terminal 230 is connected with a preset gesture storage, to provide a preset gesture signal to the second logic AND gate operation circuit 232.

Further, as shown in FIG. 4, the trigger identifier 2 further includes a touch locator 234, the output terminal of the touch detector 103 is further connected with the input terminal of the touch locator 234, and the output terminal of the touch locator 234 is connected with the input terminal of the mode controller 3, such that in the standby display, after receiving location information sent out by the touch locator 234, the mode controller 3 controls the display driver 5 to drive the touch-typed display panel for standby display.

Figure 5:
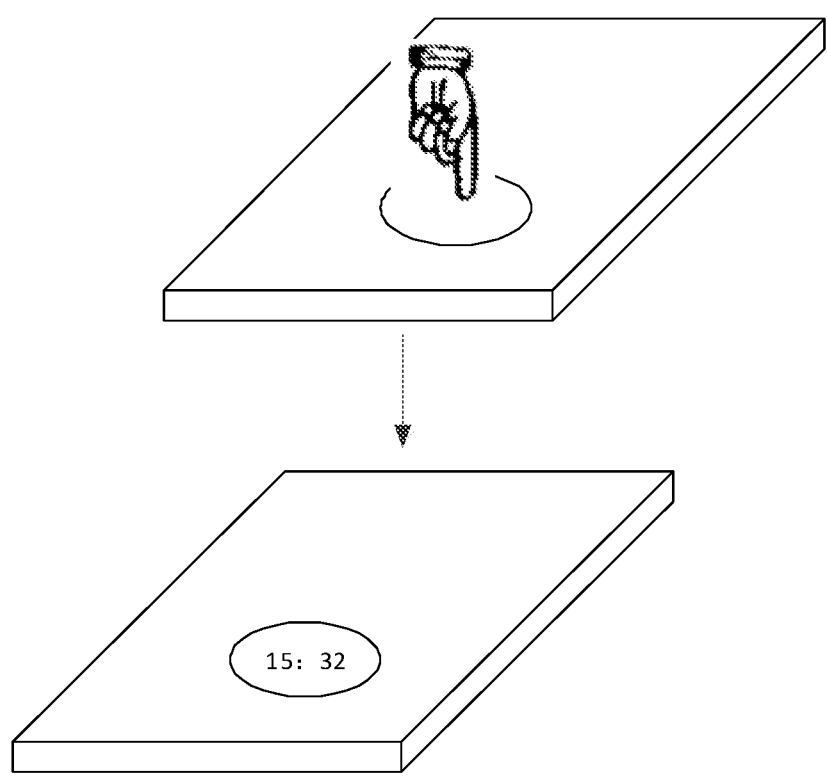
FIG. 5 is a visual operation diagram of standby display at a touch position in an embodiment of the disclosure.

Further, as shown in FIG. 5, the standby display may further be performed according to the touch position in the above embodiments. For example, when an arc area of FIG. 5 is touched, the content displayed by the standby display will show the arc area.

Figure 6:
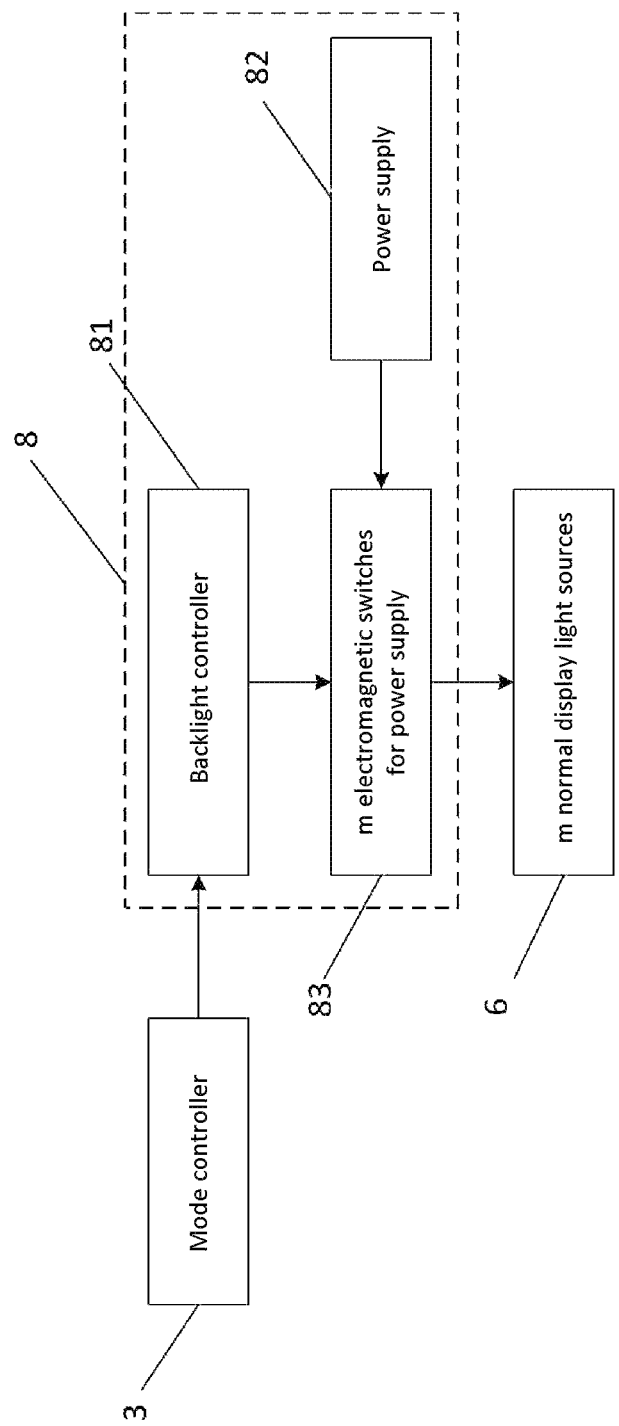
FIG. 6 is a structural block diagram of an implementation of a standby display area of which the position is variable in an embodiment of the disclosure.

In an embodiment, as shown in FIG. 6, the touch-typed display panel is a touch-typed liquid crystal display panel, which includes a standby display area located in a normal display area A, the display device further includes a backlight module, which includes m normal display light sources 6 for corresponding to the normal display area A, the display controller further includes a backlight control apparatus 8, which includes a backlight controller 81, a power supply 82 and m electromagnetic switches 83 for power supply which are connected with the power supply 82, and the m electromagnetic switches 83 for power supply are in one-to-one correspondence connection with the m normal display light sources 6, and the output terminal of the mode controller 3 is further connected with the input terminal of the backlight controller 81, and the output terminal of the backlight controller 81 is connected with the control terminals of the m electromagnetic switches 83 for power supply, respectively.

In a specific implementation, the mode controller 3 sends touch position information to the backlight controller 81, such that the backlight controller 81 controls electromagnetic switches for power supply corresponding to the touch position to be closed, to light normal display light sources corresponding to the electromagnetic switches for power supply, such that standby display is performed on the corresponding touch position of the display panel, and such an area for standby display is defined as a variable standby display area.

Figure 7:
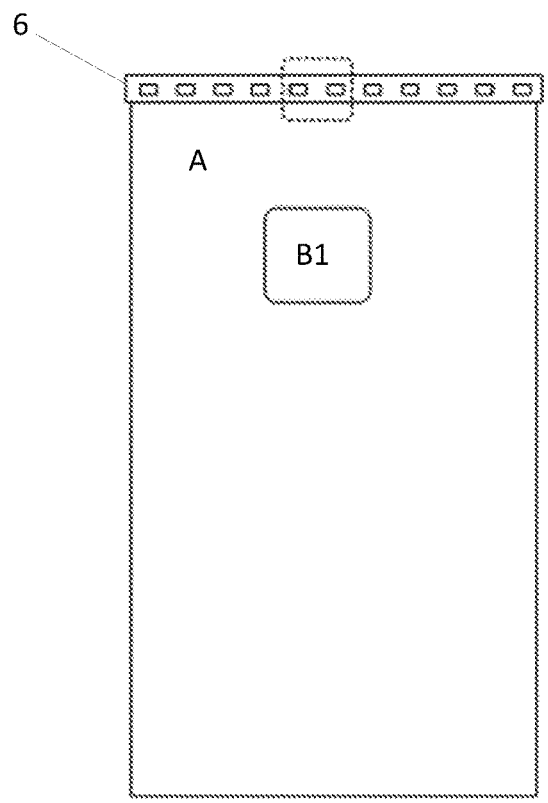
FIG. 7 is a correspondence distribution map of a first variable standby display area and standby display light sources in an embodiment of the disclosure.

As shown in FIG. 7, when the touch-typed liquid crystal display panel is touched the first time, the normal display light sources framed by the dotted box in FIG. 7 are lit, and there is a first variable standby display area B1 on the touch-typed liquid crystal display panel accordingly, which first variable standby display area B1 corresponds to the normal display light sources framed by the dotted box in FIG. 7.

Figure 8:
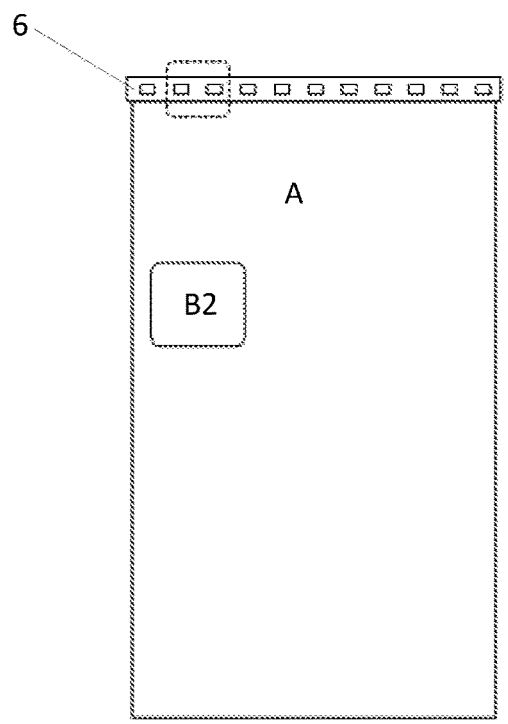
FIG. 8 is a correspondence distribution map of a second variable standby display area and standby display light sources in an embodiment of the disclosure.

As shown in FIG. 8, when the touch-typed liquid crystal display panel is touched the second time, the normal display light sources framed by the dotted box in FIG. 8 are lit, and there is a second variable standby display area B2 on the touch-typed liquid crystal display panel accordingly, which second variable standby display area B2 corresponds to the normal display light sources framed by the dotted box in FIG. 8.

Of course, when the standby display is implemented by the display device provided by the above embodiments, it may also be possible to fix the area for standby display, and the standby display area which is fixed is called a fixed standby display area B0 (see FIG. 10 and FIG. 12), and at this point, this may be implemented by the following two structures.

Figure 9:
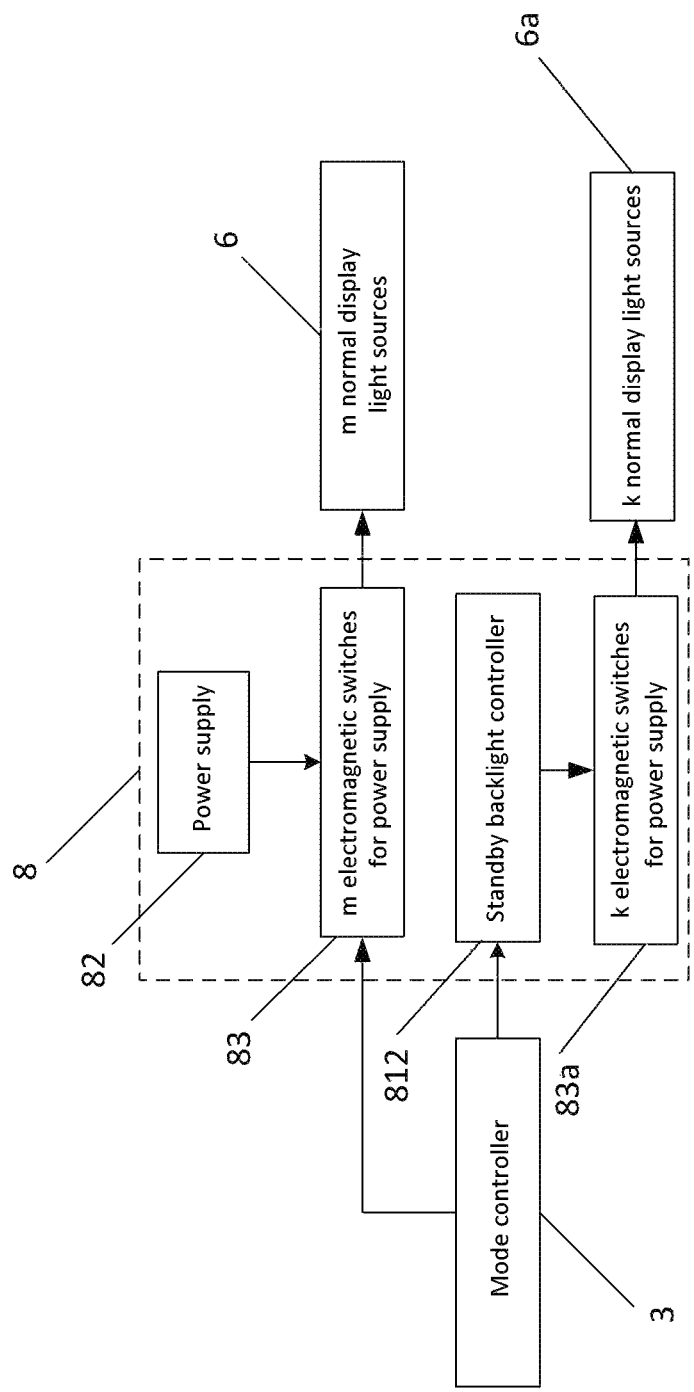
FIG. 9 is a structural block diagram One of an implementation of a standby display area of which the position is fixed in an embodiment of the disclosure.
Figure 10:
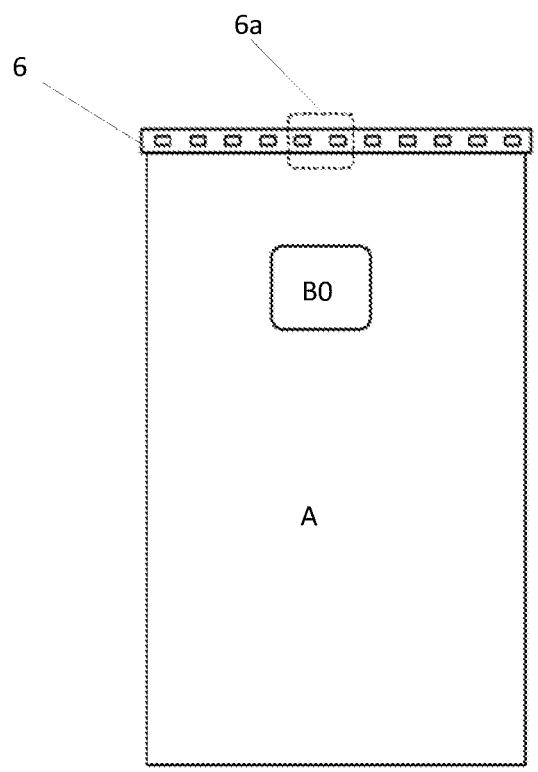
FIG. 10 is a correspondence distribution map of the fixed standby display area and standby display light sources in FIG. 9.

In a first structure, as shown in FIG. 9 and FIG. 10, the display panel is a liquid crystal display panel, which includes a standby display area located in a normal display area A, which standby display area is called a fixed standby display area B0, the display device further includes a backlight module, which includes m normal display light sources 6 for corresponding to the normal display area A, k normal display light sources 6a correspond to the fixed standby display area B0 as k standby display light sources, the display controller further includes a backlight control apparatus 8, which includes a standby backlight controller 812, a power supply 82 and m electromagnetic switches 83 for power supply which are connected with the power supply 82, the m normal display light sources 6 are in one-to-one correspondence connection with the m electromagnetic switches 83 for power supply, and 1<k<m.

The output terminal of the mode controller 3 is further connected with the control terminals of the m electromagnetic switches 83 for power supply and the input terminal of the standby backlight controller 812, respectively, and the output terminal of the standby backlight controller 812 is connected with control terminals of k electromagnetic switches 83a for power supply corresponding to the k normal display light sources 6a as the k standby display light sources, respectively, such that when the mode controller 3 receives a first trigger electrical signal, the mode controller 3 controls the standby backlight controller 812 to send out a signal to the electromagnetic switches for power supply corresponding to the k normal display light sources as standby display light sources, such that the k electromagnetic switches 83a for power supply corresponding to the k normal display light sources 6a as the k standby display light sources are closed, thereby lighting the k normal display light sources 6a as the k standby display light sources to realize standby display in the fixed standby display area B0, and on the other hand, when the mode controller 3 receives a second trigger electrical signal, the mode controller 3 controls the m electromagnetic switches 83 for power supply to be closed, such that the m normal display light sources 6 are lit, thereby realizing normal display.

Figure 11:
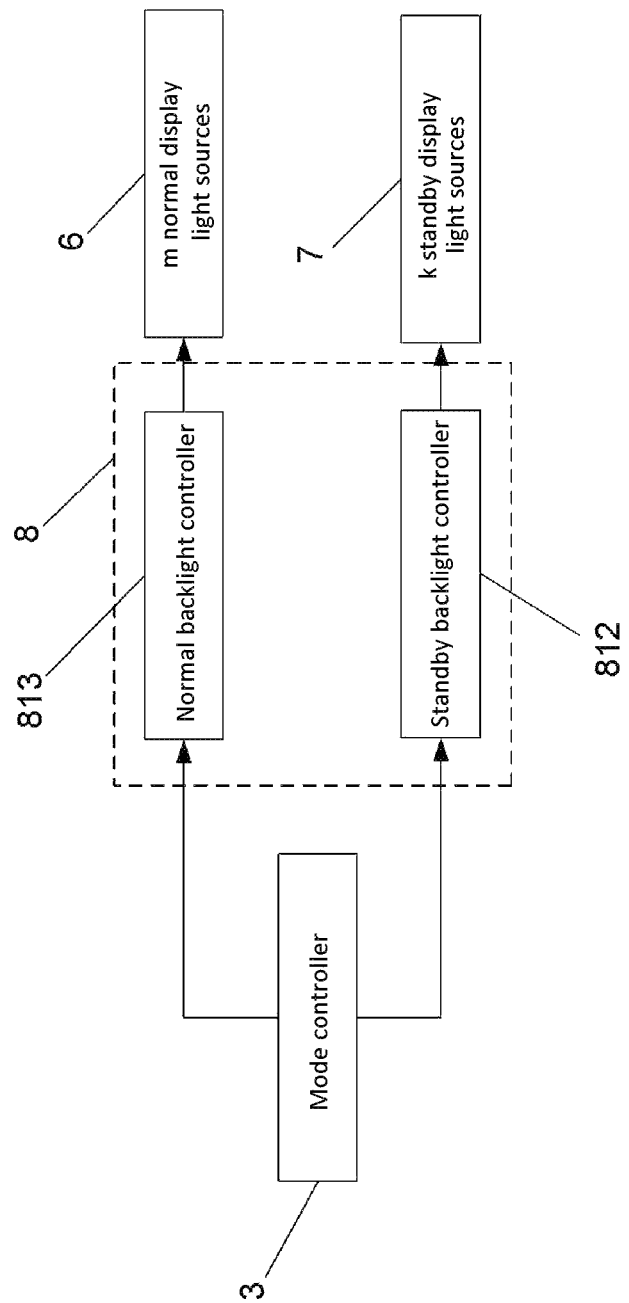
FIG. 11 is a structural block diagram Two of an implementation of a standby display area of which the position is fixed in an embodiment of the disclosure.
Figure 12:
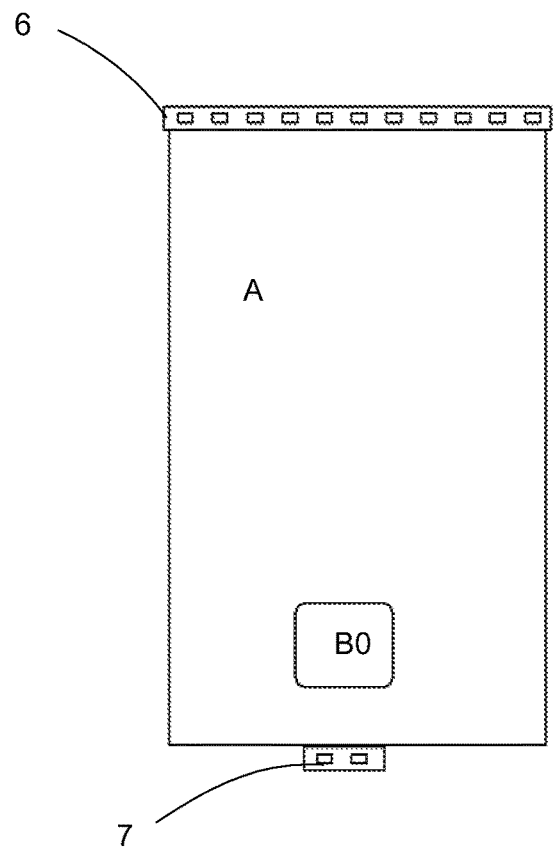
FIG. 12 is a correspondence distribution map One of the fixed standby display area and standby display light sources in FIG. 11.
Figure 13:
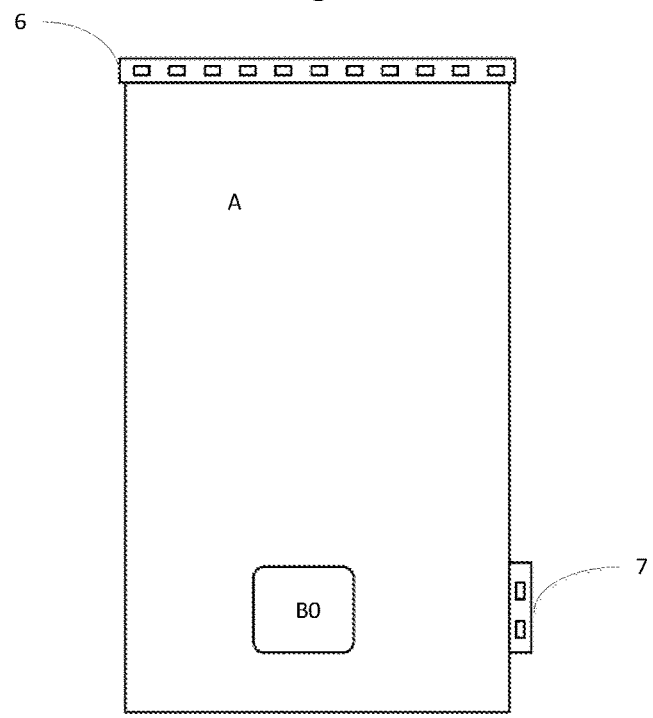
FIG. 13 is a correspondence distribution map Two of the fixed standby display area and standby display light sources in FIG. 11.

In a second structure, as shown in FIG. 11 to FIG. 13, the display panel is a liquid crystal display panel, which includes a standby display area located in a normal display area A, which standby display area is called a fixed standby display area B0, the display device further includes a backlight module, which includes a light guide diaphragm, m normal display light sources 6 for corresponding to the normal display area A, and k standby display light sources 7 for corresponding to the fixed standby display area, the m normal display light sources are located on a first side of the light guide diaphragm as a light incident surface, and the k standby display light sources are located on a second side of the light guide diaphragm.

Exemplarily, as shown in FIG. 12 and FIG. 13, the second side of the light guide diaphragm where the k standby display light sources 7 are located may be opposite or adjacent to the first side of the light guide diaphragm.

As shown in FIG. 11, the display controller further includes a backlight control apparatus 8, which includes a standby backlight controller 812 and a normal backlight controller 811, the output terminal of the mode controller 3 is connected with the control terminal of the standby backlight controller 812 and the input terminal of the normal backlight controller 811, respectively, and the output terminal of the normal backlight controller 811 is connected with the m normal display light sources, respectively, and the output terminal of the standby backlight controller 812 is connected with the k standby display light sources, respectively, at this point, when the mode controller 3 receives a first trigger electrical signal, the mode controller controls the standby backlight controller 812 to light the k standby display light sources 7, to realize standby display of the fixed standby display area B0, and on the other hand, when the mode controller receives a second trigger electrical signal, the mode controller controls the normal backlight controller 811 to light the m normal display light sources, to realize normal display.

In addition, the standby backlight controller 812 and the normal backlight controller 811 in the above embodiment are equivalent to electrically controlled switches, and it is only necessary to light corresponding display light sources after receiving a corresponding signal without the need for special method improvement. This may be implemented by for example electromagnetic switches in the prior art.

It needs to be noted that, in the above embodiments, there are various structures for the signal switcher 4. In the following, a specific structure will be given and its switching principle will be elucidated.

Figure 14:
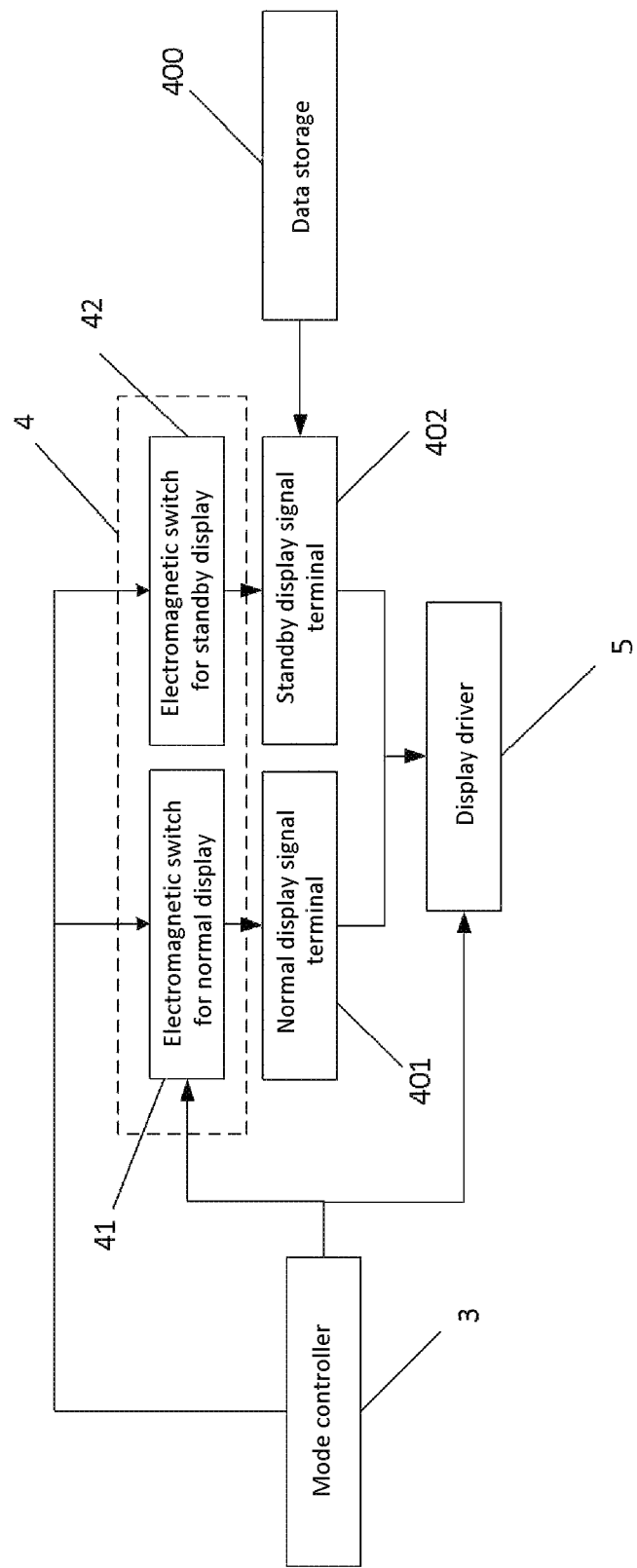
FIG. 14 is a structural block diagram of an implementation of signal switching by a signal switcher in an embodiment of the disclosure.

As shown in FIG. 14, the signal switcher 4 in the above embodiments includes an electromagnetic switch 42 for standby display and an electromagnetic switch 41 for normal display, the electromagnetic switch 42 for standby display is arranged on the standby display signal terminal 402, the electromagnetic switch 42 for normal display is arranged on the normal display signal terminal 401, and the output terminal of the mode controller 3 is connected with the control terminal of the electromagnetic switch 42 for standby display and the control terminal of the electromagnetic switch 41 for normal display, respectively.

When the mode controller 3 receives a first trigger electrical signal, the mode controller 3 controls the electromagnetic switch 42 for standby display to be closed, such that a standby display signal stored in the data storage 400 may be provided to the display driver 5 via the standby display signal terminal 402, and when the mode controller 3 receives a second trigger electrical signal, the mode controller 3 controls the electromagnetic switch 41 for normal display to be closed, such that a normal display signal may be provided to the display driver 5 via the normal display signal terminal 401.

Figure 15:
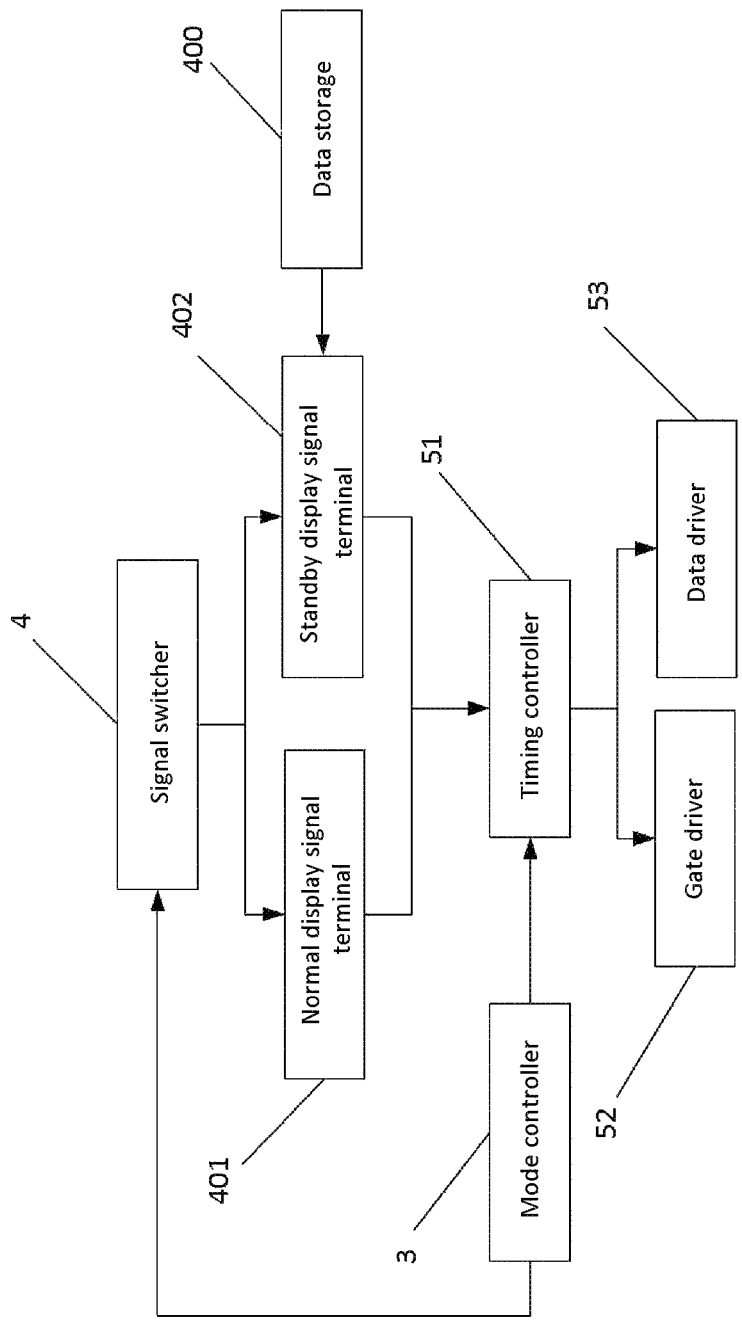
FIG. 15 is a structural block diagram of an implementation of display driving by a display driver in an embodiment of the disclosure.

The display driver 5 is an existing display driver, as shown in FIG. 15, which includes a timing controller 51, a data driver 53 and a gate driver 52, the display panel includes at least an array substrate, which includes an arrayed thin film transistor, the output terminal of the mode controller 3 is connected with the control terminal of the timing controller 51, the normal display signal terminal 401 and the standby display signal terminal 402 are connected with the input terminal of the timing controller 51, respectively, the output terminal of the timing controller 51 is connected with the input terminal of the data driver 53 and the input terminal of the gate driver 52, respectively, the output terminal of the data driver 53 is connected with the signal input terminal of the arrayed thin film transistor, and the output terminal of the gate driver 52 is connected with the control terminal of the arrayed thin film transistor.

In standby display, the mode controller 3 receives a first trigger electrical signal, controls the timing controller 51, and starts the timing controller 51, such that the timing controller 51 receives a standby data signal and transmits it to the gate driver 52 and the data driver 53 for display. In normal display, the mode controller 3 receives a second trigger electrical signal, and controls the timing controller 51, such that the timing controller 51 receives a normal data signal for display.

In addition, when the gate driver 52 is a gate drive circuit (a GOA circuit), the gate drive circuit is produced on the array substrate, and the gate drive circuit will successively turn on each row of thin film transistors in the array substrate, whether in standby display or in normal display. However, in standby display, the data driver 53 will only provide the standby data signal to several fixed columns of data lines, and therefore, in standby display, although the gate drive circuit will successively turn on each row of thin film transistors in the array substrate, not every thin film transistor in the array substrate will work.

As compared to the prior art, for the display controller and the display device provided by the disclosure, it is only necessary to trigger the standby display mode by the mode trigger in the standby state, which reduces the power consumption of the display device and the hardware loss of the display device when the display device displays its own information.

In the description of the above embodiments, specific features, structures, materials or characteristics may be combined in a suitable way in any one or more of the embodiments or examples, and various techniques may be described in a general context of software, hardware, elements or program modules. In general, the modules include routines, programs, objects, elements, components, and data structures, etc., which perform specific tasks or implement specific abstract data types. The term "ware", etc. generally represents software, firmware, hardware or a combination thereof. Features of the techniques described herein are independent of the platform, which means that the techniques may be embodied on various platform having various processors or circuits.

What are described above are just specific embodiments of the disclosure, however, the protection scope of the disclosure is not limited thereto, and variations or alternatives easily occurring to any artisan familiar with the technical field within the technical scope disclosed by the disclosure should be encompassed within the protection scope of the disclosure. Therefore, the protection scope of the disclosure should be subject to the protection scope of the claims.

The invention claimed is:

1. A display controller for a display device, the display controller comprising:
   a display driver,
   a data storage,
   a mode trigger,
   a mode controller configured to control a display panel to be in a normal display mode or a standby display mode, and
   a trigger identifier configured to identify a trigger signal output by the mode trigger,
   wherein an output terminal of the mode trigger is connected to an input terminal of the mode controller to trigger the mode controller for mode selection,
   wherein an output terminal of the mode controller is connected to a control terminal of a signal switcher and a control terminal of the display driver, respectively,
   wherein an output terminal of the signal switcher is connected to a normal display signal terminal and a standby display signal terminal connected to the data storage, respectively, and
   wherein the normal display signal terminal and the standby display signal terminal are connected to an input terminal of the display driver to provide a normal display signal and a standby display signal, respectively, and
   wherein the output terminal of the mode trigger is connected to the input terminal of the mode controller via the trigger identifier.

2. The display controller of claim 1,
   wherein the trigger identifier comprises a counting relay and a first numerical comparator, and the mode trigger comprises a preset key,
   wherein the preset key is connected to an input terminal of the counting relay, such that the counting relay counts operations of the preset key,
   wherein a first input terminal of the first numerical comparator is connected to an output terminal of the counting relay,
   wherein a second input terminal of the first numerical comparator is connected to a first reference signal terminal, and an output terminal of the first numerical comparator is connected to the input terminal of the mode controller,
   wherein the mode controller is configured to generate a trigger signal based on a comparison of an output value of the counting relay with the first reference signal terminal that is input to the mode controller.

3. The display controller of claim 1,
   wherein the trigger identifier comprises an angle identifier and a second numerical comparator, and the mode trigger comprises a direction sensor and a preset key,
   wherein the direction sensor is configured to identify a direction of the display device,
   wherein an output terminal of the direction sensor is connected to an input terminal of the angle identifier,
   wherein the angle identifier is configured to identify an angle of the display device based on the direction of the display device identified by the direction sensor,
   wherein a first input terminal of the second numerical comparator is connected to an output terminal of the angle identifier,
   wherein a second input terminal of the second numerical comparator is connected to a second reference signal terminal, and
   wherein an output terminal of the second numerical comparator and an output of the preset key are connected to input terminals of the mode controller, respectively, to generate a trigger signal based on the comparison of an output value of the angle identifier to the input value of the second reference signal terminal that is input to the mode controller.

4. The display controller of claim 3, wherein the direction sensor comprises a three-dimensional gyroscope or an angular velocity sensor, and the angle identifier comprises an angular velocity integration circuit configured to convert an angular velocity into a rotation angle.

5. The display controller of claim 3,
   wherein the display panel comprises a liquid crystal display panel comprising a standby display area in a normal display area,
   wherein the display panel comprises a backlight module comprising m normal display light sources for corresponding to the normal display area, wherein k normal display light sources correspond to the standby display area as k standby display light sources, wherein the display controller further comprises a backlight control apparatus, which comprises a standby backlight controller, a power supply and m electromagnetic switches configured to supply power and are connected to the power supply, wherein the m normal display light sources are in one-to-one correspondence in connection with the m electromagnetic switches, wherein the output terminal of the mode controller is further connected to the control terminals of the m electromagnetic switches and the input terminal of the standby backlight controller, respectively, wherein the output terminal of the standby backlight controller is connected to control terminals of electromagnetic switches corresponding to the k normal display light sources as the k standby display light sources, respectively, to control the light-on and light-off of the normal display light sources according to the output of the mode controller, and wherein 1<k<m.

6. The display controller of claim 3, wherein the display panel comprises a liquid crystal display panel comprising a standby display area located in a normal display area, wherein the display panel comprises a backlight module comprising a light guide diaphragm, m normal display light sources for corresponding to the normal display area, and k standby display light sources for corresponding to the standby display area, wherein the m normal display light sources are on a first side of the light guide diaphragm as a light incident surface, and the k standby display light sources are on a second side of the light guide diaphragm;

the display controller further comprises a backlight control apparatus, which comprises a standby backlight controller and a normal backlight controller, wherein the output terminal of the mode controller is connected to the control terminal of the standby backlight controller and the input terminal of the normal backlight controller, respectively;

wherein the output terminal of the normal backlight controller is connected to the m normal display light sources, respectively, and wherein the output terminal of the standby backlight controller is connected to the k standby display light sources, respectively, to control the light-on and light-off of the normal display light sources and the standby display light sources according to the output of the mode controller.

7. The display controller of claim 3, wherein the signal switcher comprises an electromagnetic switch for standby display and an electromagnetic switch for normal display, wherein the electromagnetic switch for standby display is on the standby display signal terminal, wherein the electromagnetic switch for normal display is on the normal display signal terminal, and wherein the output terminal of the mode controller is connected to the control terminal of the electromagnetic switch for standby display and the control terminal of the electromagnetic switch for normal display, respectively, to control the opening and closing of the electromagnetic switch for standby display and electromagnetic switch for normal display according to a trigger signal received by the mode controller.

8. The display controller of claim 1, wherein the display panel is a touch-typed display panel, wherein the mode trigger comprises a touch detector and a preset key, wherein the trigger identifier comprises a first logic AND gate operation circuit and a light sensor configured to detect light of the display surface of the touch-typed display panel, wherein an output terminal of the light sensor is connected to a first input terminal of the first logic AND gate operation circuit, wherein an output terminal of the touch detector is connected to a second input terminal of the first logic AND gate operation circuit, and wherein an output terminal of the first logic AND gate operation circuit and the preset key are connected to input terminals of the mode controller, respectively, and are configured to cause the mode controller to drive the touch-typed display panel for standby display when the touch detector detects touch information and the light sensor detects that the display screen of the touch-typed display panel has light.

9. The display controller of claim 8, wherein the touch detector comprises a gesture identifier or a fingerprint identifier, wherein the trigger identifier further comprises a second logic AND gate operation circuit, wherein a first input terminal of the second logic AND gate operation circuit is connected to the output terminal of the touch detector, and a second input terminal of the second logic AND gate operation circuit is connected to a third reference signal terminal, and wherein an output terminal of the second logic AND gate operation circuit is connected to the second input terminal of the first logic AND gate operation circuit, such that the second logic AND gate operation circuit outputs an electrical signal to the first logic AND gate operation circuit when the output signal of the touch detector is consistent with the output signal of the third reference signal terminal.

10. The display controller of claim 8, wherein the trigger identifier further comprises a touch locator, wherein the output terminal of the touch detector is further connected to an input terminal of the touch locator, and an output terminal of the touch locator is connected to the input terminal of the mode controller, such that in the standby display, after receiving location information sent out by the touch locator, the mode controller controls the display driver to drive the touch-typed display panel for standby display according to the location information.

11. The display controller of claim 10, wherein the touch-typed display panel comprises a touch-typed liquid crystal display panel comprising a standby display area in a normal display area, wherein the display panel comprises a backlight module, which comprises m normal display light sources corresponding to the normal display area;

wherein the display controller further comprises a backlight control apparatus comprising a backlight controller, a power supply and m electromagnetic switches configured to supply power and are connected to the power supply, wherein the m electromagnetic switches for power supply are in one-to-one correspondence connection with the m normal display light sources, and wherein the output terminal of the mode controller is further connected to the input terminal of the backlight controller, and the output terminal of the backlight controller is connected to control terminals of the m electromagnetic switches for power supply, respectively and are configured to control the light-on and light-off of the m normal display light sources according to the output of the mode controller.

12. The display controller of claim 1,
wherein the display driver comprises a timing controller, a data driver and a gate driver,
wherein the display panel comprises at least an array substrate comprising an arrayed thin film transistor,
wherein the output terminal of the mode controller is connected to a control terminal of the timing controller,
wherein the normal display signal terminal and the standby display signal terminal are connected to an input terminal of the timing controller, respectively,
wherein the output terminal of the timing controller is connected to an input terminal of the data driver and an input terminal of the gate driver, respectively,
wherein an output terminal of the data driver is connected to a signal input terminal of the arrayed thin film transistor, and an output terminal of the gate driver is connected to an control terminal of the arrayed thin film transistor, such that the display panel is configured to display standby display data or normal display data by the timing controller under the control of the mode controller.

13. A display device comprising the display panel and the display controller of claim 1.

14. The display device of claim 13, wherein the display panel comprises an OLED display panel.

15. The display device of claim 13,
wherein the trigger identifier comprises a counting relay and a first numerical comparator,
wherein the mode trigger comprises a preset key,
wherein the preset key is connected to an input terminal of the counting relay, such that the counting relay counts operations of the preset key,
wherein a first input terminal of the first numerical comparator is connected to an output terminal of the counting relay,
wherein a second input terminal of the first numerical comparator is connected to a first reference signal terminal, and an output terminal of the first numerical comparator is connected to the input terminal of the mode controller,
wherein the mode controller is configured to generate a trigger signal based on a comparison of an output value of the counting relay with the first reference signal terminal that is input to the mode controller.

16. The display device of claim 13,
wherein the trigger identifier comprises an angle identifier and a second numerical comparator, and the mode trigger comprises a direction sensor and a preset key,
wherein the direction sensor is configured to identify a direction of the display device,
wherein an output terminal of the direction sensor is connected to an input terminal of the angle identifier,
wherein the angle identifier configured to identify an angle of the display device based on the direction of the display device identified by the direction sensor,
wherein a first input terminal of the second numerical comparator is connected to an output terminal of the angle identifier,
wherein a second input terminal of the second numerical comparator is connected to a second reference signal terminal, and
wherein an output terminal of the second numerical comparator and an output of the preset key are connected to input terminals of the mode controller, respectively, to generate a trigger signal based on the comparison of an output value of the angle identifier to the input value of the second reference signal terminal that is input to the mode controller.

17. The display device of claim 16, wherein the direction sensor comprises a three-dimensional gyroscope or an angular velocity sensor, and the angle identifier comprises an angular velocity integration circuit configured to convert an angular velocity into a rotation angle.

18. The display device of claim 13,
wherein the display panel comprises a touch-typed display panel,
wherein the mode trigger comprises a touch detector and a preset key,
wherein the trigger identifier comprises a first logic AND gate operation circuit and a light sensor configured to detect light of the display surface of the touch-typed display panel,
wherein an output terminal of the light sensor is connected to a first input terminal of the first logic AND gate operation circuit,
wherein the output terminal of the touch detector is connected to a second input terminal of the first logic AND gate operation circuit, and
wherein an output terminal of the first logic AND gate operation circuit and an output terminal of the preset key are connected to input terminals of the mode controller, respectively, and are configured to cause the mode controller to drive the touch-typed display panel for standby display when the touch detector detects touch information and the light sensor detects that the display screen of the touch-typed display panel has light.

* * * * *